No. 782,955. PATENTED FEB. 21, 1905.
A. L. EMENS.
GOLF CLUB.
APPLICATION FILED OCT. 12, 1904.
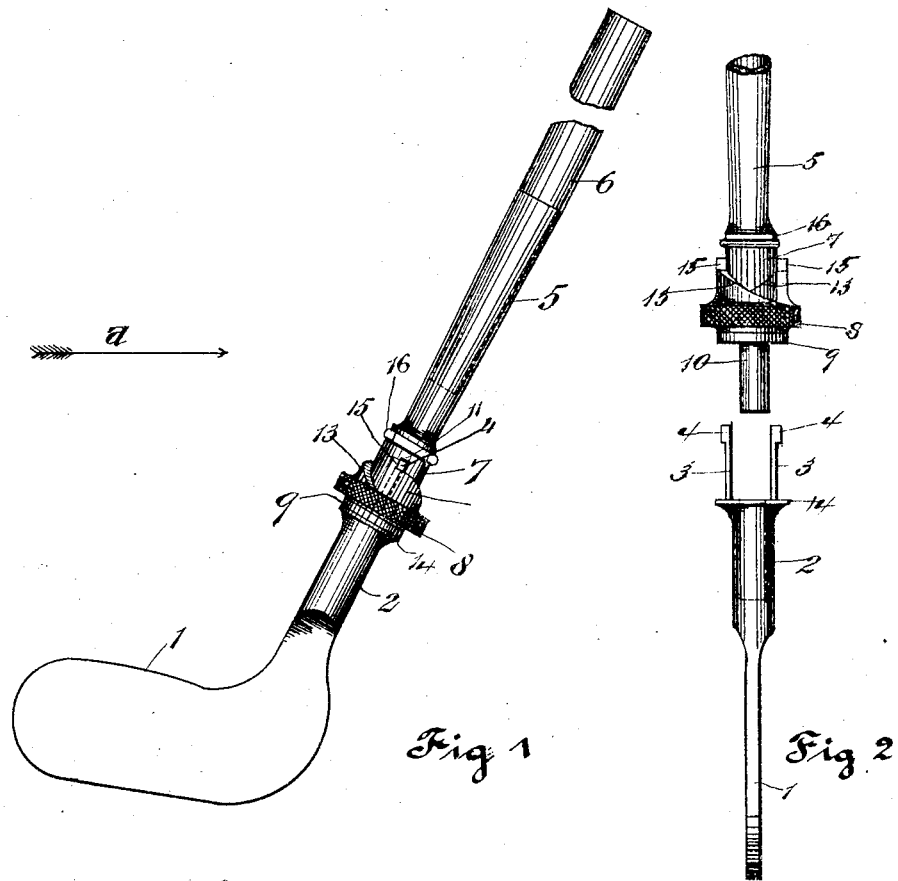
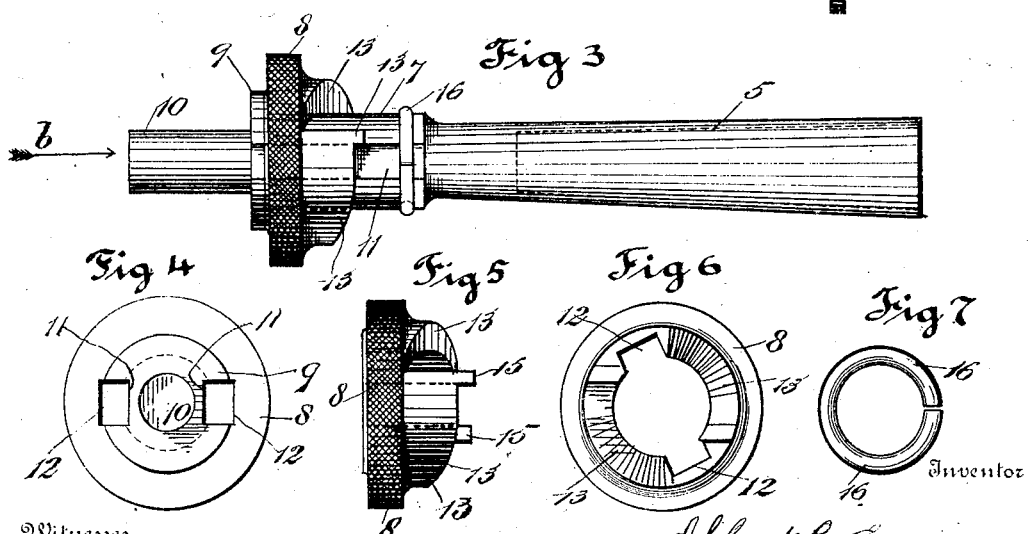

No. 782,955. Patented February 21, 1905.

UNITED STATES PATENT OFFICE.

ALBERT L. EMENS, OF LAFAYETTE, INDIANA.

GOLF-CLUB.

SPECIFICATION forming part of Letters Patent No. 782,955, dated February 21, 1905.

Application filed October 12, 1904. Serial No. 228,223.

*To all whom it may concern:*

Be it known that I, ALBERT L. EMENS, a citizen of the United States, residing at Lafayette, in the county of Tippecanoe and State of Indiana, have invented certain new and useful Improvements in Golf-Clubs, of which the following is a specification, reference being had therein to the accompanying drawings.

This invention relates to golf-clubs; and its object is to construct a club in such a way that the head will be removable from the stick or shaft and to provide means whereby heads of different sizes and forms may be applied to the same shaft at different times, as the case may require, thereby avoiding the necessity of carrying a number of golf-heads with the sticks attached thereto for use when on the field. I attain these objects by means of the arrangement of golf-head-fastening means illustrated in the accompanying drawings, in which similar numerals of reference designate like parts throughout the several views.

Figure 1 is a side elevational view of a golf-club having a removable head. Fig. 2 is a broken view of the same, showing the stick or shaft detached from the head and looking in the direction of the arrow *a*. (See Fig. 1.) Fig. 3 is an enlarged detail view of the ferrule bottom portion of the shaft of the golf-club, showing the cam-collar on the same. Fig. 4 is an end view of the ferrule and ferrule of the golf-club looking in the direction of the arrow *b*. (See Fig. 3.) Fig. 5 is a detail side view of the cam-collar. Fig. 6 is an end view of the same, and Fig. 7 is a spring retaining-ring for retaining the cam-collar in position on the enlarged portion of the end of the ferrule.

The head 1 of the golf-club may be of any size or form or one of a series of sizes or forms used, and the same is provided with the hollow neck or socket 2, formed integral on said head. On the end of the socket 2 is formed the spring-prongs 3, which are situated on diametrically opposite sides of the bore of said socket 2 and project therefrom in a direct line parallel with the axis of the said socket, and said prongs are provided with the hooks or catches 4, formed on their free ends. A ferrule 5 is secured on the end of the shaft or stick 6, and on the end of the ferrule is formed the enlarged cylindrical portion 7, on which is mounted the collar 8, which is adapted to freely turn thereon. On the end of the enlarged cylindrical portion 7 of the ferrule is formed integral thereon the retaining-collar 9, and projecting from the end of said cylindrical portion 7 of said ferrule and central therewith is the dowel or pintle 10, which dowel or pintle is adapted to closely and accurately fit the bore of the socket 2. On diametrically opposite sides of the cylindrical portion 7 of said ferrule are formed the ways or recesses 11, which ways or recesses correspond with the ways or recesses 12, formed in the collar 8, and the said ways or recesses 11 and 12 are adapted to receive the prongs 3, by which the pintle or dowel 10 is inserted in the bore of the socket 2. A further function performed by the prongs 3 is that of preventing the head 1 from turning on the pintle or dowel 10. The prongs neatly fit in the ways 11 and prevent any movement or rotation of the head 1, since the said prongs 3 and the socket 2 are one integral piece. End cams or inclined planes 13 are formed on the side of said collar 8, and the same are provided to simultaneously engage the catches 4 of the prongs 3 to firmly draw the socket 2 over the dowel or pintle 10 till the collar 14 opposite the socket is drawn up into close contact with the collar 9 to securely hold said golf-head 1 to said shaft or stick. Stops 15 are formed at the terminals of each of the cams 13 to limit the extent of rotation of the collar 8. A groove is formed on the cylindrical portion 7 of the ferrule 5 opposite the collar 9, and the same is adapted to receive the retaining or keeper spring-ring 16, and the said ring 16 is provided for the purpose of preventing the collar 8 sliding longitudinally off the cylindrical portion 7. With this arrangement it is clear that any number of sizes and forms of golf-heads 1 may be constructed with a fastening in the manner shown and any one of which forms may be readily applied at different times to a shaft or stick constructed in the manner described, thereby avoiding the necessity of carrying golf-clubs the heads of which are not removable from the shafts and lessening the burden or load to be carried over the distance traversed.

Having thus fully described this my invention, what I claim as new and useful, and desire to cover by Letters Patent of the United States therefor, is—

1. In a golf-club, the combination with a removable head, a socket formed on said head, catches projecting from the end of said socket, of a stick or shaft, a sleeve or ferrule on the end of said stick or shaft, said ferrule having an enlarged cylindrical end portion, a collar integral on the end of said enlarged portion, a dowel or pintle on the end of the enlarged portion of said ferrule, a collar loosely mounted to turn on said enlarged cylindrical end portion and abutting said integral collar, said cylindrical portion recessed or slotted to receive said catches, and cams formed on the sides of said loose collar and adapted to engage said catches.

2. In a golf-club, the combination with a removable head, a socket formed on said head, prongs projecting from the end of said socket on diametrically opposite sides of the bore thereof, catches on the ends of said prongs, of a stick or shaft, a sleeve or ferrule on the end of said stick or shaft, said ferrule having an enlarged cylindrical end portion, a collar integral on the end of said enlarged end portion, a dowel or pintle projecting from the end of said enlarged portion of said ferrule, a collar mounted to turn on said enlarged cylindrical end portion and abutting said integral collar, said collars and said cylindrical enlarged portion recessed or slotted to receive said projecting prongs, and cams on diametrical sides of said loose collar adapted to simultaneously engage the catches on the end of said prongs.

3. In a golf-club, the combination with a removable head, a socket formed on said head, catches projecting from the end of said socket, of a stick or shaft, a sleeve or ferrule on the end of said stick or shaft, said ferrule having an enlarged cylindrical end portion, a collar integral on the end of said enlarged portion, a dowel or pintle on the end of said enlarged portion of said ferrule, a collar loosely mounted to turn on said enlarged cylindrical end portion and abutting said integral collar, said cylindrical portion recessed or slotted to receive said catches and cams formed on the sides of said loose collar and adapted to engage said catches, a recess on the opposite end of said cylindrical portion and a spring keeper-ring adapted to engage said recess.

4. In a golf-club, the combination with a removable head, a socket formed on said head, catches projecting from the ends of said socket, of a stick or shaft, a sleeve or ferrule on the end of said stick or shaft, a pintle or dowel on the end of said ferrule, means for securing said pintle or dowel to said socket to connect said stick or shaft to said head and means for preventing said head from turning on said stick or shaft.

In testimony whereof I affix my signature in presence of two witnesses.

BERT. L. EMENS.

Witnesses:
CHARLES JONES,
E. J. SCOTT.